United States Patent
Chen et al.

(10) Patent No.: US 8,521,791 B2
(45) Date of Patent: Aug. 27, 2013

(54) ELECTRONIC DEVICE AND FILE MANAGEMENT METHOD

(75) Inventors: Yu-Chun Chen, New Taipei (TW); Wen-Chieh Kuo, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/206,537

(22) Filed: Aug. 10, 2011

(65) Prior Publication Data

US 2012/0233226 A1    Sep. 13, 2012

(30) Foreign Application Priority Data

Mar. 10, 2011 (TW) .............................. 100108021 A

(51) Int. Cl.
*G06F 17/30* (2006.01)
(52) U.S. Cl.
USPC ........................................................ 707/822
(58) Field of Classification Search
USPC .................. 707/803, 805, 825; 345/173
See application file for complete search history.

(56) References Cited

U.S. PATENT DOCUMENTS

| | | | | |
|---|---|---|---|---|
| 7,831,643 | B1 * | 11/2010 | Beloussov et al. | 707/823 |
| 8,111,244 | B2 * | 2/2012 | Lee et al. | 345/173 |
| 2004/0059792 | A1 * | 3/2004 | Tapola | 709/213 |
| 2007/0198561 | A1 * | 8/2007 | Lee et al. | 707/101 |
| 2007/0262964 | A1 * | 11/2007 | Zotov et al. | 345/173 |
| 2008/0036743 | A1 * | 2/2008 | Westerman et al. | 345/173 |
| 2008/0088602 | A1 * | 4/2008 | Hotelling | 345/173 |
| 2008/0297482 | A1 * | 12/2008 | Weiss | 345/173 |
| 2009/0070382 | A1 * | 3/2009 | Agrawal et al. | 707/200 |
| 2009/0089258 | A1 * | 4/2009 | Ke | 707/3 |
| 2009/0213086 | A1 * | 8/2009 | Chae et al. | 345/173 |
| 2010/0077333 | A1 * | 3/2010 | Yang et al. | 715/769 |
| 2010/0077334 | A1 * | 3/2010 | Yang et al. | 715/769 |
| 2010/0077337 | A1 * | 3/2010 | Yang et al. | 715/771 |
| 2010/0114852 | A1 * | 5/2010 | Itoh | 707/705 |
| 2010/0180209 | A1 * | 7/2010 | Yang et al. | 715/748 |
| 2010/0299635 | A1 * | 11/2010 | Oh et al. | 715/811 |
| 2012/0036460 | A1 * | 2/2012 | Cieplinski et al. | 715/769 |
| 2012/0050530 | A1 * | 3/2012 | Raman et al. | 348/142 |
| 2012/0120002 | A1 * | 5/2012 | Ota | 345/173 |

\* cited by examiner

*Primary Examiner* — Cam-Linh Nguyen
(74) *Attorney, Agent, or Firm* — Altis Law Group, Inc.

(57) ABSTRACT

In a file management method of an electronic device, multi-touch operations on a touch screen of the electronic device is detected in real-time. File attributes of operating objects of the electronic device that are selected by a multi-touch operation are acquired, and a file type is determined for each of the operating objects according to the file attributes of each of the operating objects, wherein the file type is a file or a folder. The operating objects are managed according to the file type of each of the operating objects.

15 Claims, 6 Drawing Sheets

ELECTRONIC DEVICE AND FILE MANAGEMENT METHOD

BACKGROUND

1. Technical Field

Embodiments of the present disclosure relate generally to file management, and more particularly, to an electronic device and a file management method of the electronic device.

2. Description of Related Art

Electronic devices, such as smart mobile phones, personal digital assistants (PDAs), and mobile internet devices (MID), are widely used. More and more files, such as files of various applications, may be stored in an electronic device. In general, a user of the electronic device may manage the files by manually copying, pasting, and moving the files, for example. However, that file management method of copying, pasting, and moving files is very inconvenient and time consuming.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
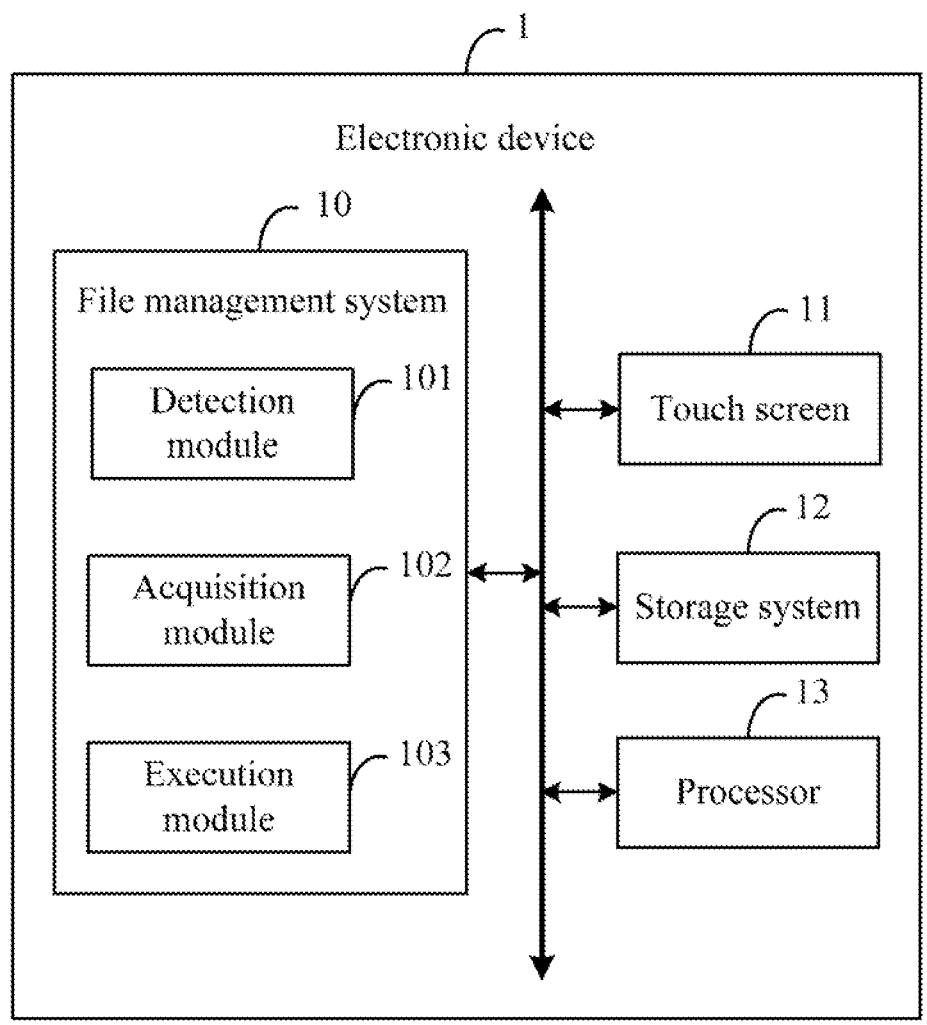
FIG. 1 is a block diagram of one embodiment of an electronic device including a file management system.

FIG. 1 is a block diagram of one embodiment of an electronic device 1 including a file management system 10. In the embodiment, the electronic device 1 further includes a touch screen 11 that may be capacitive or resistive, a storage system 12, and a processor 13. The file management system 10 can detect multi-touch operations on the touch screen 11, and manage files selected by the multi-touch operations according to attributes of the files. It should be apparent that FIG. 1 is only one example of the electronic device 1 and it can include more or fewer components than shown in the embodiment, or a different configuration of the various components.

The file management system 10 may include a plurality of software programs in form of one or more computerized instructions that are stored in the storage system 12, and executed by the processor 13 to perform operations of the electronic device 1. In the embodiment, the file management system 10 includes a detection module 101, an acquisition module 102, and an execution module 103. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 2A:
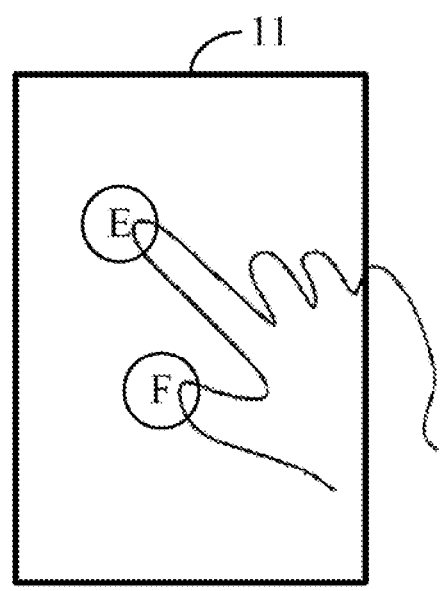
FIG. 2A-FIG. 2D are schematic diagrams illustrating one example of managing files of the electronic device according to a multi-touch operation on a touch screen of the electronic device of FIG. 1.

The detection module 101 is operable to detect multi-touch operations on the touch screen 11 in real-time. In response to a detected multi-touch operation, the detection module 101 is further operable to determine a duration of time of the multi-touch operation on the touch screen 11, such as, one second, or two seconds, and if the duration of time is equal to a predetermined time period. In the embodiment, the multi-touch operation refers to a presence of two or more points of contact (e.g., fingers or styli) that are simultaneously sensed by the touch screen 11. In one example, as shown in FIG. 2A, the multi-touch operation may be contacts on points "E" and "F" of the touch screen 11.

The acquisition module 102 is operable to acquire file attributes of operating objects of the electronic device 1 selected by the multi-touch operation if the duration of time is equal to the predetermined time period, and determine a file type for each of the operating objects according to the file attributes of each operating object. In the embodiment, the file type of each of the operating objects may be a file or a folder. The file may be a text, an image, or other kinds of files such as executable files of an application of the electronic device 1. The folder may include a plurality of files and subfolders. The file attributes of each of the operating objects may be acquired by accessing a file system of the electronic device 1. The file attributes of each operating object may include, for example, name, size and type of the operating object, and time information that the object is created.

Figure 2B:
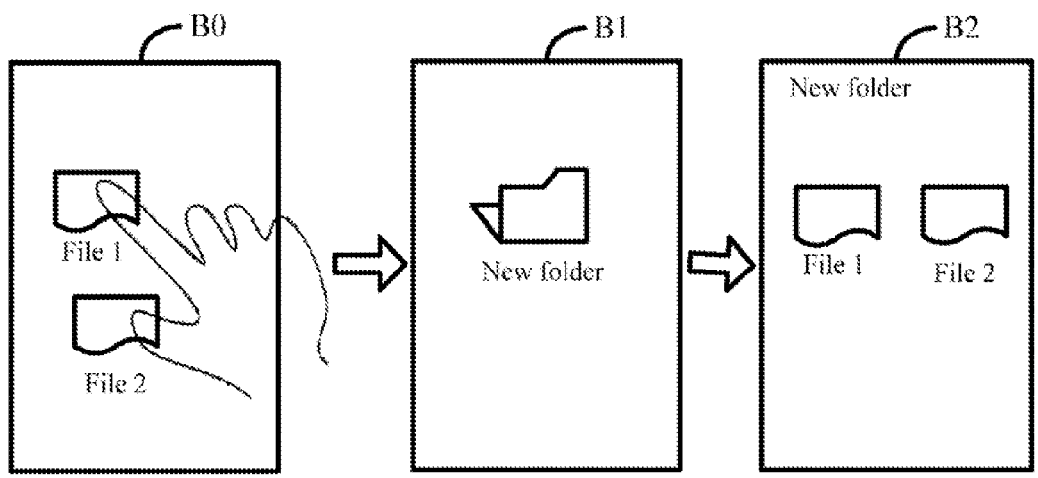

The execution module 103 is operable to manage the operating objects according to the file type of each of the operating objects. In one embodiment, if each of the operating objects is not a folder, the execution module 103 manages the operating objects by creating a new folder in the storage system 12, and moving the operating objects into the new folder. In one example, as shown in FIG. 2B, when two files "file 1" and "file 2" are selected by the multi-touch operation (e.g., B0 of FIG. 2B), a new folder is created (e.g., B1 of FIG. 2B), and then "file 1" and "file 2" are moved into the new folder (e.g., B2 of FIG. 2B).

Figure 2C:
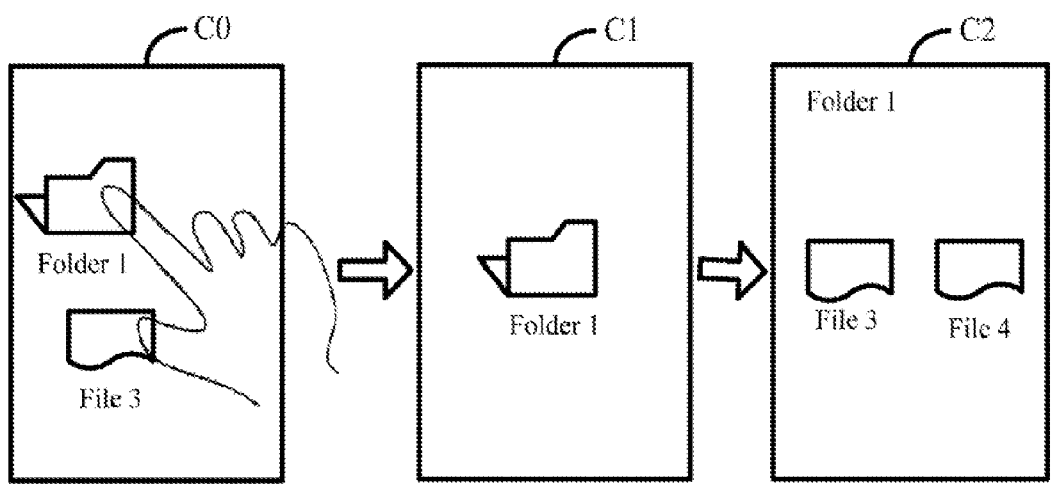

If the operating objects include one folder, the execution module 103 manages the operating objects by moving files of the operating objects into the folder. In one example, as shown in FIG. 2C, the operating objects include a "file 3" and a "folder 1" (e.g., C0 of FIG. 2C). The "file 3" may be moved into the "folder 1" (e.g., C1 of FIG. 2C). When the "file 3" is moved into the "folder 1", the "folder 1" includes "file 3" and "file 4", (e.g., C2 of FIG. 2C).

Figure 2D:
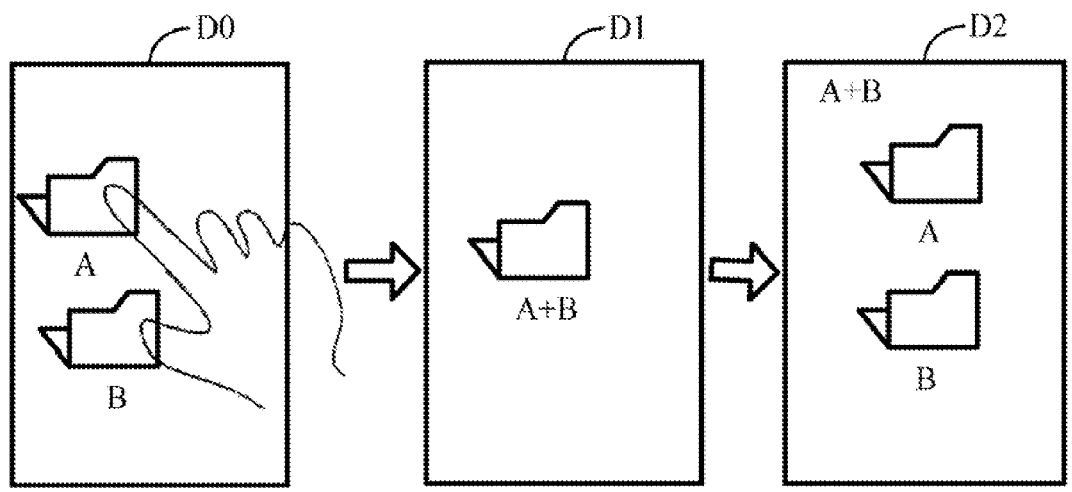

If the operating objects include two or more folders, the execution module 103 manages the operating objects by creating a new folder in the storage system 12, and moving all of the operating objects into the new folder. In one example, as shown in FIG. 2D, when two folders "A" and "B" are selected by the multi-touch operation (e.g., D0 of FIG. 2D), a new folder "A+B" is created (e.g., D1 of FIG. 2D), and then the folders "A" and "B" are moved into the new folder "A+B" (e.g., D2 of FIG. 2D).

In other embodiments, if the operating objects include two or more folders, the execution module 103 may manage the operating objects by determining one of the two or more folders as a target folder, and then moving the other operating objects into the target folder. The target folder may be determined according to a name of each folder, or time information when the folder is created. For example, a folder that is first created may be determined as the target folder.

Figure 3:
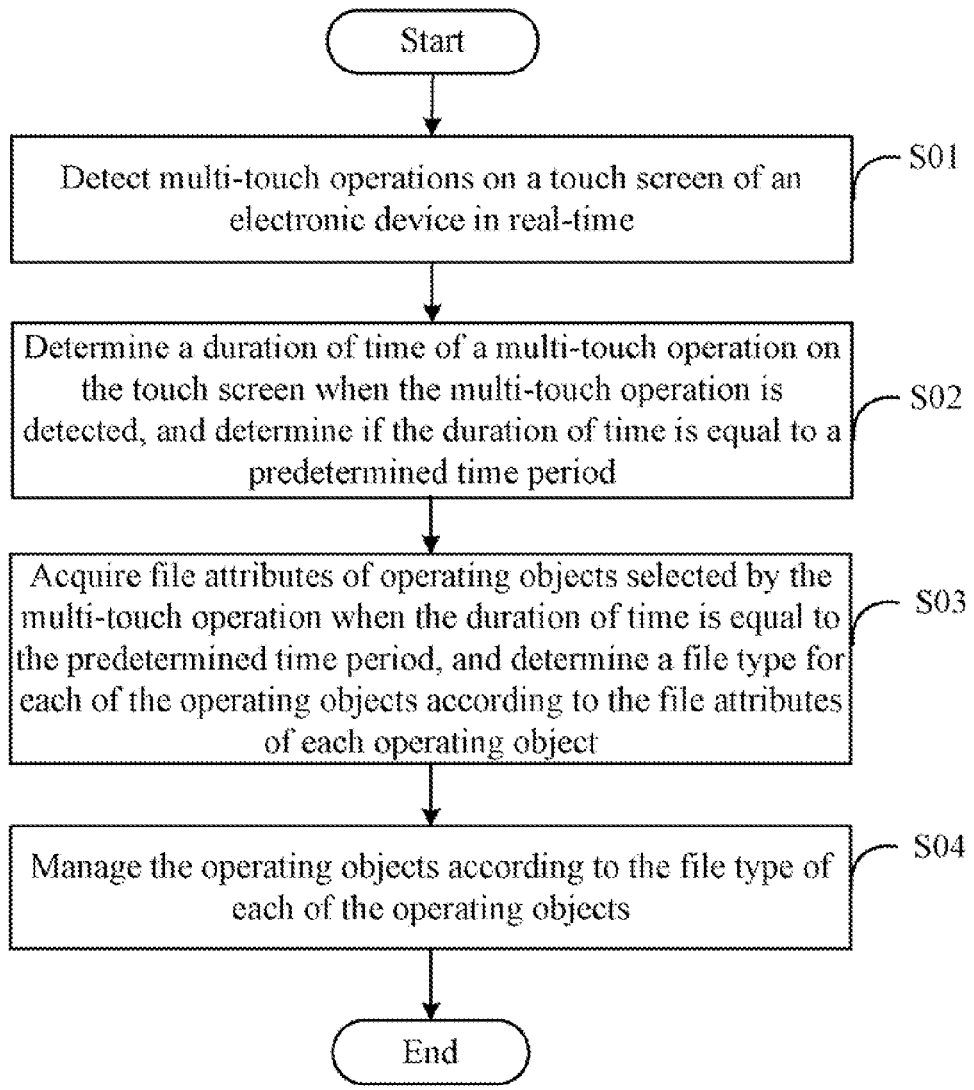
FIG. 3 is a flowchart of one embodiment of a method for managing files of the electronic device using the system of FIG. 1.

FIG. 3 is a flowchart of one embodiment of a method for managing files of the electronic device 1 using the system of FIG. 1. Depending on the embodiment, additional blocks may be added, others removed, and the ordering of the blocks may be changed.

In block S01, the detection module 101 detects multi-touch operations on the touch screen 11 in real-time. In the embodiment, the multi-touch operation refers to a presence of two or more points of contact that are simultaneously sensed by the touch screen 11.

In block S02, the detection module 101 determines a duration of time of a multi-touch operation on the touch screen 11, such as, one second, or two seconds, when the multi-touch operation is detected, and determines if the duration of time is equal to a predetermined time period.

In block S03, the acquisition module 102 acquires file attributes of operating objects of the electronic device 1 selected by the multi-touch operation when the duration of time is equal to the predetermined time period, and determines a file type for each of the operating objects according to the file attributes of each operating object. In the embodiment, the file type of each operating object may be a file or a folder. The file may be a text, an image, or other kinds of file such as an executable file of an application of the electronic device 1. The file attributes of each operating object may be acquired by accessing a file system of the electronic device 1.

In block S04, the execution module 103 manages the operating objects according to the file type of each of the operating objects. Details of managing the operating objects are described in paragraph [0011] to paragraph [0014].

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for managing files of an electronic device comprising a touch screen, the method comprising:
   detecting a multi-touch operation on the touch screen in real-time;
   determining a duration of time of the multi-touch operation on the touch screen, and determining if the duration of time is equal to a predetermined time period;
   acquiring file attributes of operating objects of the electronic device that are selected by the multi-touch operation when the duration of time is equal to the predetermined time period, wherein the file attributes of each of the operating objects comprises a name, a size and a file type of the operating object, and time information when the operating object is created;
   determining a file type for each of the operating objects according to the file attributes of each of the operating objects, wherein the file type is a file or a folder; and
   managing the operating objects according to the file type of each of the operating objects.

2. The method according to claim 1, wherein the managing step comprises:
   creating a new folder in a storage system of the electronic device and moving the operating objects into the new folder, if each of the operating objects is not a folder;
   moving files of the operating objects into one folder of the operating objects, if the operating objects comprise one folder; or
   creating a new folder in the storage system and moving all of the operating objects into the new folder, if the operating objects comprise two or more folders.

3. The method according to claim 1, wherein the managing step comprises:
   determining a folder from folders of the operating objects as a target folder, and moving the other operating objects into the target folder, if the operating objects comprise two or more folders.

4. The method according to claim 3, wherein the target folder is determined according to a name of each folder of the operating objects or time information when each folder is created.

5. The method according to claim 1, wherein the multi-touch operation refers to a presence of two or more points of contact that are simultaneously sensed by the touch screen.

6. An electronic device, comprising:
   a touch screen;
   at least one processor;
   a storage system; and
   one or more programs stored in the storage system and being executable by the at least one processor, the one or more programs comprising:
   a detection module operable to detect a multi-touch operation on the touch screen in real-time, determine a duration of time of the multi-touch operation on the touch screen, and determine if the duration of time is equal to a predetermined time period;
   an acquisition module operable to acquire file attributes of operating objects of the electronic device that are selected by the multi-touch operation when the duration of time is equal to the predetermined time period, and determine a file type for each of the operating objects according to the file attributes of each of the operating objects, wherein the file attributes of each of the operating objects comprises a name, a size and a file type of the operating object, and time information when the operating object is created, and the file type is a file or a folder; and
   an execution module operable to manage the operating objects according to the file type of each of the operating objects.

7. The electronic device according to claim 6, wherein the operating objects are managed by:
   creating a new folder in the storage system and moving the operating objects into the new folder, if each of the operating objects is not a folder;
   moving files of the operating objects into one folder of the operating objects, if the operating objects comprise one folder; or
   creating a new folder in the storage system, and moving all of the operating objects into the new folder, if the operating objects comprise two or more folders.

8. The electronic device according to claim 6, wherein the operating objects are managed by determining a folder from folders of the operating objects as a target folder, and moving the other operating objects into the target folder, if the operating objects comprise two or more folders.

9. The electronic device according to claim 8, wherein the target folder is determined according to a name of each folders of the operating objects or time information when each folder is created.

10. The electronic device according to claim 6, wherein the multi-touch operation refers to a presence of two or more points of contact that are simultaneously sensed by the touch screen.

11. A non-transitory storage medium storing a set of instructions, the set of instructions capable of being executed by a processor of an electronic device, cause the electronic device to perform a file management method, the method comprising:

detecting a multi-touch operation on a touch screen of the electronic device in real-time;

determining a duration of time of the multi-touch operation on the touch screen, and determining if the duration of time is equal to a predetermined time period;

acquiring file attributes of operating objects of the electronic device that are selected by the multi-touch operation when the duration of time is equal to the predetermined time period, wherein the file attributes of each of the operating objects comprises a name, a size and a file type of the operating object, and time information when the operating object is created;

determining a file type for each of the operating objects according to the file attributes of each of the operating objects, wherein the file type is a file or a folder; and managing the operating objects according to the file type of each of the operating objects.

12. The non-transitory storage medium according to claim 11, wherein the managing step comprises:

creating a new folder in a storage system of the electronic device and moving the operating objects into the new folder, if each of the operating objects is not a folder;

moving files of the operating object into one folder of the operating objects, if the operating objects comprise one folder; or creating a new folder in the storage system and moving all of the operating objects into the new folder, if the operating objects comprise two or more folders.

13. The non-transitory storage medium according to claim 11, wherein the managing step comprises:

determining a folder from folders of the operating objects as a target folder, and moving the other operating objects into the target folder, if the operating objects comprise two or more folders.

14. The non-transitory storage medium according to claim 13, wherein the target folder is determined according to a name of each folder of the operating objects or time information when each folder is created.

15. The non-transitory storage medium according to claim 11, wherein the multi-touch operation refers to a presence of two or more points of contact that are simultaneously sensed by the touch screen.

* * * * *